US008422952B2

(12) United States Patent
Sato et al.

(10) Patent No.: US 8,422,952 B2
(45) Date of Patent: *Apr. 16, 2013

(54) WIRELESS COMMUNICATION TERMINAL AND SOUND VOLUME CONTROL METHOD

(75) Inventors: Hiroto Sato, Tokyo (JP); Toshiya Tamura, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 99 days.

This patent is subject to a terminal disclaimer.

(21) Appl. No.: 12/837,669

(22) Filed: Jul. 16, 2010

(65) Prior Publication Data

US 2011/0014871 A1   Jan. 20, 2011

(30) Foreign Application Priority Data

Jul. 17, 2009   (JP) ................................. 2009-169241

(51) Int. Cl.
*H04B 7/00*   (2006.01)
(52) U.S. Cl.
USPC ... 455/41.2; 455/41.1; 455/41.3; 379/374.01; 379/374.02; 381/74; 381/109
(58) Field of Classification Search ........ 455/41.1–41.3, 455/272.6, 426.1, 567, 569.1, 569.2, 575.2; 379/374.01–374.03; 381/74, 109, 370–373
See application file for complete search history.

(56) References Cited

U.S. PATENT DOCUMENTS

| 7,908,555 B2* | 3/2011 | Zellner | 715/718 |
| 2007/0142942 A1* | 6/2007 | Hyatt | 700/94 |

FOREIGN PATENT DOCUMENTS

| JP | 2002-176487 A | 6/2002 |
| JP | 2006-270601 A | 10/2006 |

OTHER PUBLICATIONS

Bluetooth Hands-Free Profile 1.5 (Bluetooth SIG); pp. 27-31; 50-52, 78, 79. Nov. 25, 2005.
JP Office Action mailed on Nov. 13, 2012 in application No. 2009-169241.

* cited by examiner

*Primary Examiner* — Tuan H Nguyen
(74) *Attorney, Agent, or Firm* — Maschoff Brennan

(57) ABSTRACT

A wireless communication terminal comprising a network communication unit, short distance wireless communication unit, an input unit and a control unit. The network communication unit transmits radio signals to communication network via a base station. The short distance wireless communication unit transmits radio signals to and from an external device. The short distance wireless communication unit establishes a voice link between the wireless communication terminal and the external device to transmit sound data. The input unit inputs a volume control instruction. The control unit controls the short distance wireless communication unit to send a signal based on the volume control instruction if the voice channel is established between the wireless communication terminal and the external device.

15 Claims, 6 Drawing Sheets

WIRELESS COMMUNICATION TERMINAL AND SOUND VOLUME CONTROL METHOD

CROSS-REFERENCE TO RELATED APPLICATION

This application is based upon and claims the benefit of priority from Japanese Patent Application No. 2009-169241, filed Jul. 17, 2009; the entire contents of which are incorporated herein by reference.

FIELD

Embodiments disclosed herein relate generally to a wireless communication terminal and a sound volume control method.

BACKGROUND

Recently, for example, as a wireless communication technology applicable to an electronic apparatus and the like, Bluetooth® has been known. As a call control profile of the Bluetooth®, a "Hands-Free Profile (HFP)" has been known. The HFP defines a function by which an electronic apparatus such as cell phone controls volume of external device.

When a HFP connection is established between the cell phone and the external device, after an establishment of a lower layer is completed, support function notification is transmitted to the cell phone from the external device. If the external device supports the sound volume control, the support notification includes information representing that the sound volume control is supported. Then, if the HFP connection is established, volume update notification is notified to the cell phone from the external device. According to an initial volume update notification after the HFP connection is established, an initial volume level of the external device is notified to the cell phone from the external device (see FIG. 6). The cell phone receives the support notification of the volume control from the external device and receives the volume update notification (notification of the initial volume level) after the HFP connection is established, so that volume control instruction for the external device is possible. The volume control instruction of the cell phone with respect to the external device represents a function by which the cell phone instructs volume adjustment of the external device. Further, after the volume control instruction of the cell phone with respect to the external device is possible, when volume adjustment based on a volume adjustment operation is performed in the external device, volume update notification is transmitted to the cell phone from the external device.

In addition, according to the HFP, when an incoming call is received in the cell phone, a ringtone called an in-band ringtone can be notified to the external device. According to a function of notifying the in-band ringtone, a voice link is established when the cell phone receives an incoming call, and the cell phone encodes a ringtone and loaded the encoded ringtone on the voice link. The external device receives and decodes the encoded ringtone then plays the decoded ringtone. In general, it is considered that, in relation to the in-band ringtone, ringing volume in the external device can be turned up and down by the volume control instruction from the cell phone. However, when in-band ringtone ringing has not been set, the cell phone notifies the external device of the reception of the incoming call. When the in-band ringtone ringing has not been set, whether the ringtone rings in the external device is dependent on implementation of the external device, but it is usual that a specific ringtone held and generated in the external device is allowed to ring (refer to Bluetooth® Hands-Free Profile 1.5 (Bluetooth® SIG)).

However, such volume control may cause the following problems. First, for example, in the case in which the HFP connection is completely established between external device supporting a volume control function and a cell phone storing the Bluetooth® HFP, when a voice path is established in the cell phone during communication and a speaker of the external device is muted, although a user has performed a volume-up operation to turn up the volume of the cell phone during the communication, the communication volume of the cell phone is not changed and a volume setting value of the muted external device is increased. Thus, when releasing the muting of the external device after the voice path is switched to the external device, voice may ring with a high level.

Second, in the case of a cell phone that performs volume control with respect to external device only when a voice path is not established in the cell phone, and in-band ringtone notification becomes invalid when an incoming call has occurred, the cell phone cannot control the volume of external device. Thus, in such a situation, if the volume cannot be adjusted by the external device, even if volume of a specific ringtone of the external device is too low or high, the volume of the ringtone output from the external device cannot be adjusted.

DETAILED DESCRIPTION

According to an embodiment of the invention, a wireless communication terminal comprises: a network communication unit configured to transmit radio signals to communication network via a base station; a short distance wireless communication unit configured to transmit radio signals to and from an external device, the short distance wireless communication unit establishes a voice link between the wireless communication terminal and the external device to transmit sound data; an input unit configured to input a volume control instruction; and a control unit configured to control the short distance wireless communication unit to send a signal based on the volume control instruction if the voice channel is established between the wireless communication terminal and the external device.

That is, according to an aspect of the invention, it is possible to provide the wireless communication terminal capable of performing communication with external device after performing volume control of adjusting volume of the external device to an appropriate level.

Hereinafter, an embodiment of the invention will be described with reference to the accompanying drawings. Herein, a case, in which a cell phone capable of performing short distance wireless communication performs volume control with respect to car kit, will be described as an example. However, external device is not limited to the car kit, and may be applied to other device such as a headset.

Figure 1:
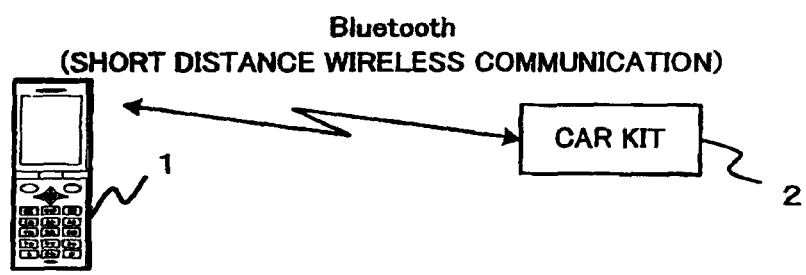
FIG. 1 is a diagram illustrating a relationship between a cell phone and equipment wirelessly connected to the cell phone according to an embodiment of the invention.

FIG. 1 is a diagram illustrating a relationship between a cell phone 1 and car kit 2 wirelessly connected to the cell phone 1 according to the embodiment of the invention. The cell phone 1 transmits volume control instruction based on the HFP to the car kit 2 through short distance wireless communication. Volume of the car kit 2 may be adjusted in according to an operation received by an operation unit for volume adjustment provided therein. In such a case, the car kit 2 transmits volume update notification to the cell phone 1.

Figure 2:
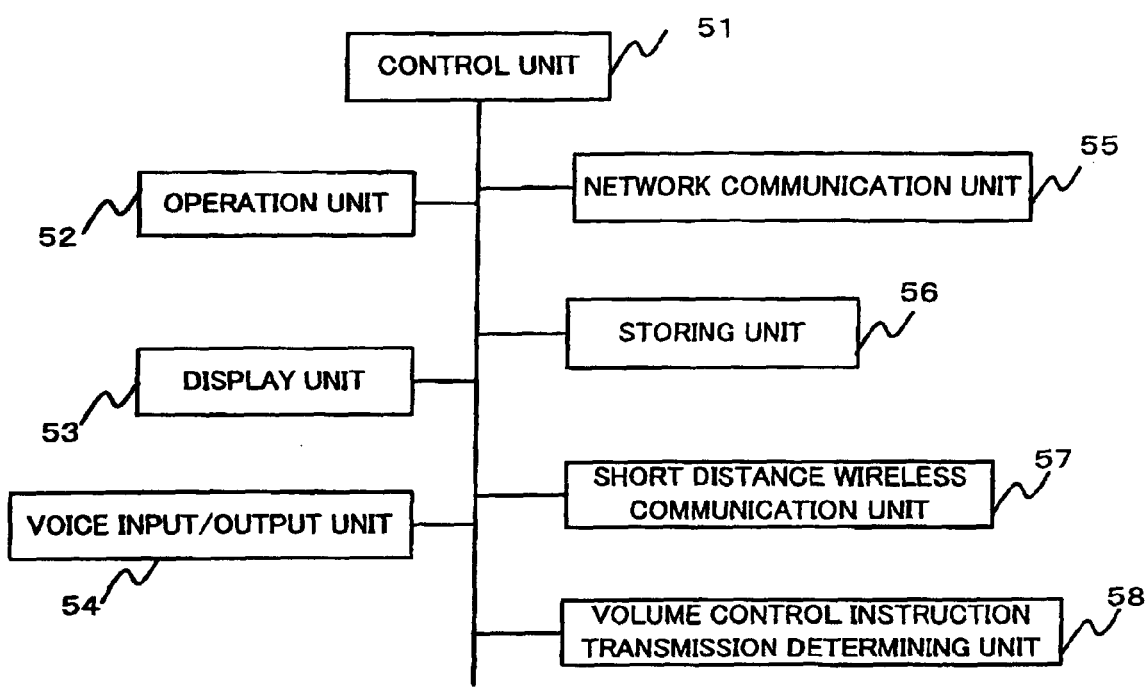
FIG. 2 is a block diagram illustrating the configuration of a cell phone according to an embodiment of the invention.

FIG. 2 is a block diagram illustrating the configuration of the cell phone 1 according to the embodiment of the invention. The cell phone 1 includes a control unit 51, an operation unit 52, a display unit 53, a voice input/output unit 54, a network communication unit 55, a storing unit 56, a short distance wireless communication unit 57 and a volume control instruction transmission determining unit 58.

The control unit 51 includes a CPU, a ROM, a RAM and the like, and does not only perform a general process of the cell phone 1, but also controls processes of the short distance wireless communication unit 57 and the volume control instruction transmission determining unit 58. Further, the control unit 51 performs analysis of support information by support function notification from external device and a response via the short distance wireless communication unit 57, analysis of a volume level informed volume update notification from the external device and a response to the external device via the short distance wireless communication unit 57, volume control instruction via the short distance wireless communication unit 57 with respect to the volume level of the external device under the determination of the volume control instruction transmission determining unit 58, voice link establishment from the external device or the cell phone, other control operations for satisfying functions generally defined in the HFP, and the like, based on information from the short distance wireless communication unit 57. Furthermore, the control unit 51 entrusts the volume control instruction transmission determining unit 58 with a part of a determination regarding whether volume control is necessary based on information from a data input unit or information of the control unit 51, and then performs volume control instruction and volume update notification response instruction with respect to the short distance wireless communication unit 57.

The operation unit 52 includes an operation key, a touch panel, a touch sensor or the like. The operation unit 52 generates a signal based on an operation by a user, and transmits the signal to the control unit 51. The operation unit 52 includes a button for instructing volume adjustment.

The display unit 53 includes a liquid crystal display, an organic EL display or the like, and displays characters or images according to an operation of applications.

The voice input/output unit 54 includes a speaker and a microphone, and performs voice input/output for voice communication through the network communication unit 55, output of sound of a music content or a moving image content, and the like.

The network communication unit 55 performs voice communication or packet communication through a base station. For example, in the case of transmitting voice through the voice communication, the network communication unit 55 converts data, which is acquired by performing signal processing such as encoding or error control with respect to voice data obtained from a voice received from the microphone of the voice input/output unit 54, into a radio wave, and transmits the radio wave to the base station. Further, in relation to reception voice, a radio wave received from the base station is converted into an electric signal, and is subject to signal processing such as decoding or error correction, so that voice is output from the speaker of the voice input/output unit 54. Further, a usual call state of the cell phone 1 includes a standby state, a communication state, an incoming state, an originating state, an answer holding state and the like. The incoming state represents the state in which a call is originated to a cell phone of a corresponding phone number from a caller, the base station searches for the cell phone of the corresponding phone number, and generation of the calling from the caller in the cell phone is informed to a user. At this time, for example, it is usual that the short distance wireless communication unit notify the incoming state of the cell phone 1 to the external device, the speaker outputs a ringtone, the display unit displays the occurrence of an incoming call. Herein, if a user performs a response operation, the cell phone 1 is in the communication state. If the user performs a call rejection operation, the cell phone 1 is in the standby state. If the user performs a holding operation, the cell phone 1 is in the answer holding state. However, the state of the cell phone 1 is not limited thereto.

The storing unit 56 stores various types of application software, a music content, a moving image content and the like.

The short distance wireless communication unit 57 includes a Bluetooth® communication module, and enables voice communication in hands-free equipment by using the HFP or can transmit audio data to external device without using an audio cable by using an A2DP (Advanced Audio Distribution Profile). The short distance wireless communication unit 57 can perform physical control and logical control to a Bluetooth® chip, which mainly performs Bluetooth® communication according to the instructions from the control unit 51. The physical control, for example, includes physical session management for performing radio communication with external device, and the like, as well as power supply. The logical control, for example, includes session management of a HFP control link, session management of a HFP audio link, analysis and generation of data transmitted over a control link by using the HFP, and the like.

The volume control instruction transmission determining unit 58 performs a volume control instruction transmission determination based on an incoming state and a voice link state according to the instructions from the control unit 51. The volume control instruction transmission determining unit 58 can be set in one of the following three modes. Further, the volume control instruction transmission determining unit 58 may have less or equal to three modes of the following three modes and if it has more than one mode, the volume control instruction transmission determining unit 58 selects one mode.

In a first mode, when a voice link has been established by the short distance wireless communication unit 57, the volume control instruction transmission determining unit 58 performs volume control instruction with respect to external device via the short distance wireless communication unit 57. However, when the voice link has not been established by the short distance wireless communication unit 57, the volume control instruction transmission determining unit 58 does not perform the volume control instruction with respect to the external device via the short distance wireless communication unit 57.

In a second mode, when the cell phone 1 is in the incoming state, the volume control instruction transmission determining unit 58 performs the volume control instruction with respect to the external device via the short distance wireless communication unit 57. However, when the cell phone 1 is not in the incoming state, the volume control instruction transmission determining unit 58 does not perform the volume control instruction with respect to the external device via the short distance wireless communication unit 57.

In a third mode, when the voice link has been established by the short distance wireless communication unit 57 or the cell phone 1 is in the incoming state, the volume control instruction transmission determining unit 58 performs the volume control instruction with respect to the external device via the short distance wireless communication unit 57. However, when the cell phone 1 is not in the incoming state in the case in which the voice link has not been established by the short distance wireless communication unit 57, the volume control instruction transmission determining unit 58 does not perform the volume control instruction with respect to the external device via the short distance wireless communication unit 57.

The case in which the voice link has been established represents the state in which microphone input through the external device is encoded, is transmitted to the cell phone through the voice link and is regarded as microphone input of the cell phone, and, data which must ring from the speaker of the cell phone is encoded, is transmitted to the external device through the voice link, is decoded by the external device, and then is output from the speaker thereof. Further, the case in which the voice link has been established represents the case in which a communication is performed with a communication partner in the external device via a base station network and the cell phone, a dial tone is notified to the external device, or an in-band ring tone is notified to the external device during the ringing of the in-band ringtone.

When the volume control instruction is performed, at least a volume level is transmitted to the external device. Further, when the volume control instruction is performed, information of images or characters representing that volume control is possible may be notified to the display unit 53. In addition, sound (for example, "beep-beep" sound) representing that the volume control is possible may be notified to the voice input/output unit 54.

When the volume control instruction is not performed, at least the volume level is not transmitted to the external device. At this time, information of images or characters representing that the volume control is impossible may be notified to the display unit 53. In addition, sound (for example, "beep-beep-beep" sound) representing that the volume control is impossible may be notified to the voice input/output unit 54.

Figure 3:
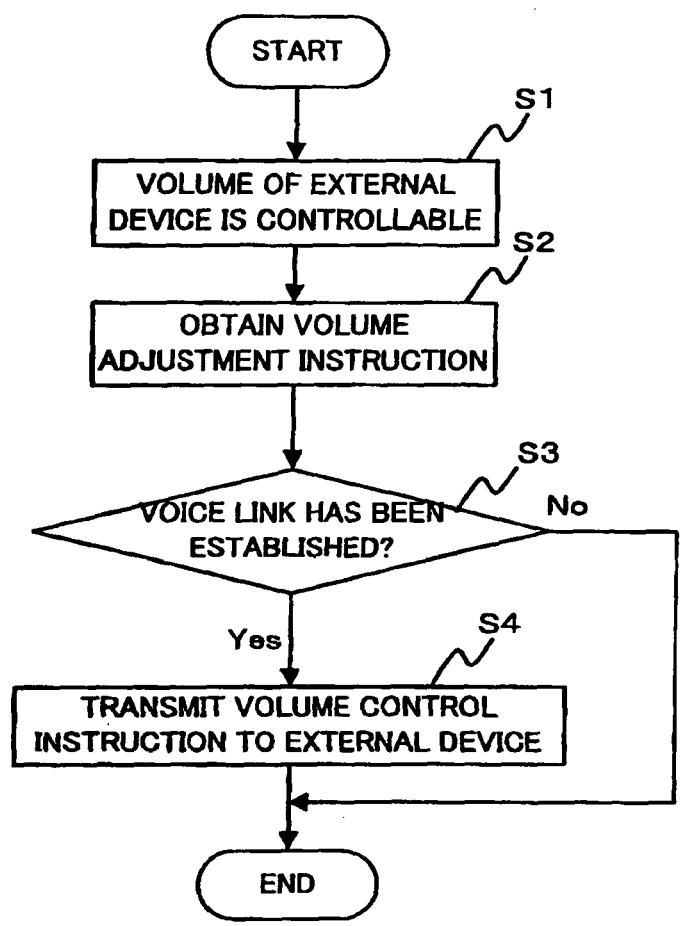
FIG. 3 is flowchart illustrating the process of a volume control instruction transmission determining unit of a cell phone according to an embodiment of the invention.

FIG. 3 is a flowchart illustrating the process of the volume control instruction transmission determining unit 58. The flowchart of FIG. 3 will be described on the assumption that the first mode has been set in the volume control instruction transmission determining unit 58. First, it is considered that the volume of the external device is controllable by the cell phone 1 (S1). That is, the cell phone 1 stores the Bluetooth® HFP. When the HFP connection is established between the external device and the cell phone 1, the cell phone 1 receives support function notification, which represents that a volume control function is supported, from the external device. After the HFP connection is established between the external device and the cell phone 1, the cell phone 1 receives initial volume update notification (representing an initial volume level of the external device) from the external device. In such a state, the cell phone 1 obtains volume adjustment instruction from a user through the operation unit 52 (S2). Then, the volume control instruction transmission determining unit 58 determines whether a voice link is established between the external device and the cell phone 1 (S3). As a result of the determination, if the voice link is established therebetween (Yes of S3), the volume control instruction transmission determining unit 58 transmits volume control instruction to the external device (S4). However, if the voice link is not established therebetween (No of S3), the volume control instruction transmission determining unit 58 does not transmit the volume control instruction to the external device.

When the second mode is set in the volume control instruction transmission determining unit 58, the determination of Step S4 in the flowchart of FIG. 3 is replaced with a determination regarding whether the incoming call occurs in the cell phone 1. Further, when the third mode is set in the volume control instruction transmission determining unit 58, the determination of Step S4 is replaced with a determination regarding whether the cell phone 1 corresponds to at least one of "the state in which the voice link is established" and "the state in which the incoming call occurs".

In addition, the configurations and processing share of the short distance wireless communication unit 57, the control unit 51 and the volume control instruction transmission determining unit 58 are not limited thereto. For example, the volume control instruction transmission determining unit 58 may be included in the control unit 51.

Furthermore, the volume adjustment instruction is not always obtained through the operation unit 52. For example, when a communication is to be faded out, the volume adjustment instruction may be generated during the process of the control unit 51.

Figure 4:
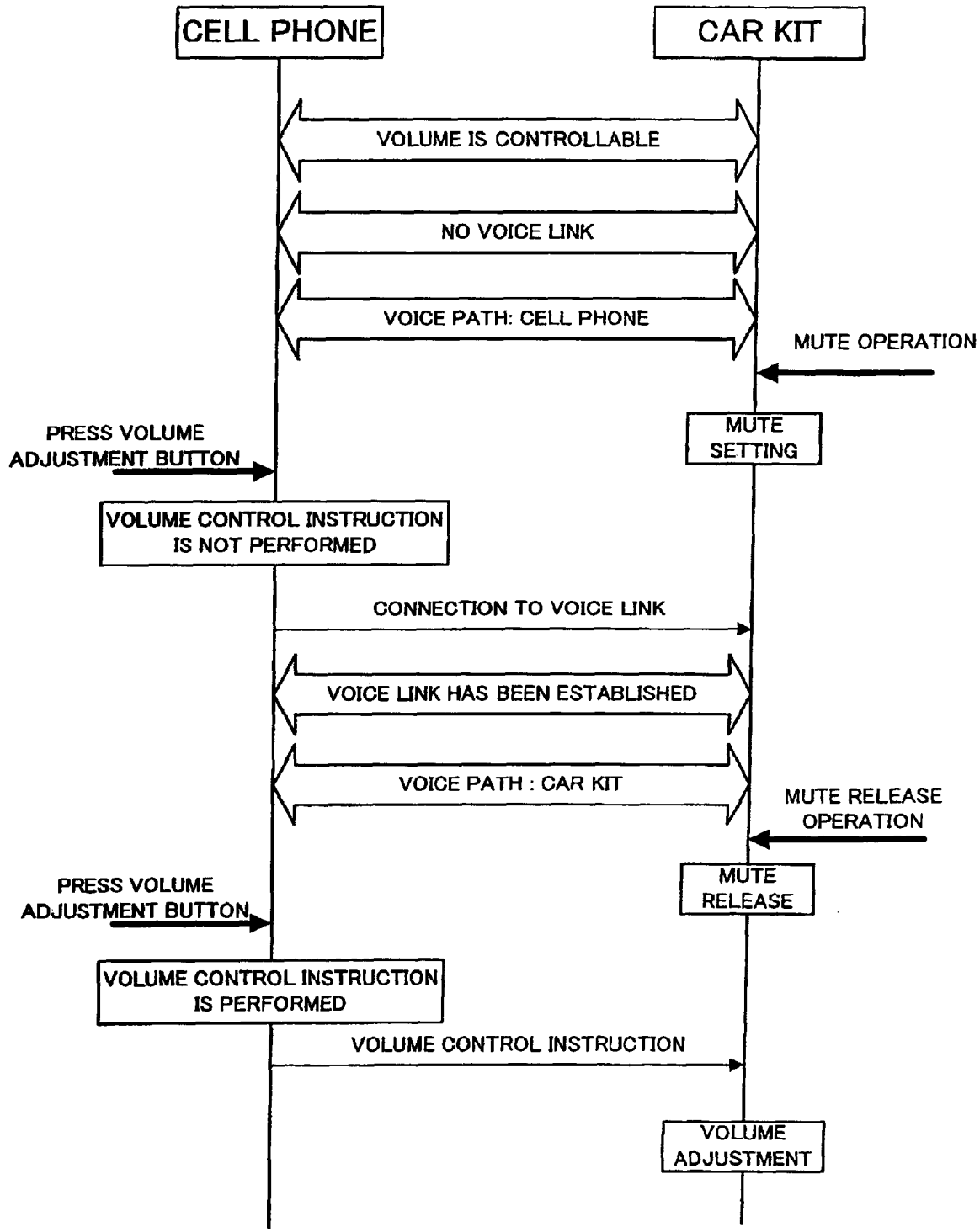
FIG. 4 is a sequence diagram illustrating a cell phone, in which a volume control instruction transmission determining unit is set in a first mode, and on-vehicle equipment according to an embodiment of the invention.

FIG. 4 is a sequence diagram illustrating the cell phone 1 having the above configuration, in which the volume control instruction transmission determining unit 58 is set in the first mode, and the car kit 2.

First, after the cell phone 1 is powered on, a standby screen is displayed on the display unit 53. The control unit 51 has variables for managing a HFP connection state, a support state of volume control and a volume update notification state. Immediately after the cell phone 1 is powered on, these variables represent no HFP connection, no support information and no volume update notification.

Next, a connection is established between lower layers of the car kit 2 and the cell phone 1, and the cell phone 1 receives support function notification from the car kit 2. If the control unit 51 recognizes that the car kit 2 supports the volume control through the support function notification received from the car kit 2, the control unit 51 changes the variable for managing the support state of the volume control to a variable representing that the car kit 2 supports the volume control. Further, if the HFP connection is established, the control unit 51 changes the variable representing the HFP connection state to a variable representing that the cell phone 1 is connected to the car kit 2 through the HFP connection. Further, after the HFP connection is established, if the cell phone 1 receives volume update notification, which represents the initial volume level of the car kit 2, from the car kit 2, the control unit 51 of the cell phone 1 changes the variable for managing the volume update notification state to a variable representing that the volume update notification has been performed. In this way, the cell phone 1 can control the volume of the car kit 2.

If an incoming call is received through the network communication unit 55 and a termination response signal is received via the operation unit 52, the cell phone 1 is in a communication state through a voice path. At this time, if a volume adjustment signal is received from the operation unit 52 of the cell phone 1, the volume control instruction transmission determining unit 58 determines whether to perform the volume control instruction. For example, when the first mode has been set in the volume control instruction transmission determining unit 58, since no voice link is established between the cell phone 1 and the car kit 2, the cell phone 1 does not perform the volume control instruction with respect to the car kit 2. Even if the volume adjustment signal is continuously received, the cell phone 1 does not perform the volume control instruction.

Due to such a determination of the volume control instruction transmission determining unit 58, for example, even if the volume adjustment signal is received from the operation unit 52 of the cell phone 1 in the state in which the speaker of the car kit 2 is in a mute state, since no volume control instruction is transmitted to the car kit 2 from the cell phone 1, the volume of the car kit 2 is not adjusted. Further, when the speaker of the car kit 2 is released from the mute state, it is possible to prevent sound with a high level from being suddenly output from the speaker of the car kit 2.

If the operation unit 52 of the cell phone 1 is operated to establish a voice link between the cell phone 1 and the car kit 2 and a voice path is switched to the car kit 2, communication voice rings from the car kit 2.

Herein, if the volume adjustment signal is received from the operation unit 52 of the cell phone 1, the volume control instruction transmission determining unit 58 determines whether to perform the volume control instruction. For example, when the first mode has been set in the volume control instruction transmission determining unit 58, since the voice link is established between the cell phone 1 and the car kit 2, the cell phone 1 performs the volume control instruction with respect to the car kit 2. For example, in the case in which the initial volume setting value "10" of the car kit 2 is notified to the cell phone 1 from the car kit 2 by using the volume update notification when the HFP connection has been established between the cell phone 1 and the car kit 2, if a volume-down operation is performed through the operation unit 52 of the cell phone 1, at least one of volume setting values "0" to "9" is transmitted to the car kit 2.

Due to such a determination of the volume control instruction transmission determining unit 58, the volume adjustment control for the external device can be performed by the cell phone 1 only when the voice link is established, so that the volume of the external device can be adjusted to an appropriate level when a user has carelessly performed volume control.

Figure 5:
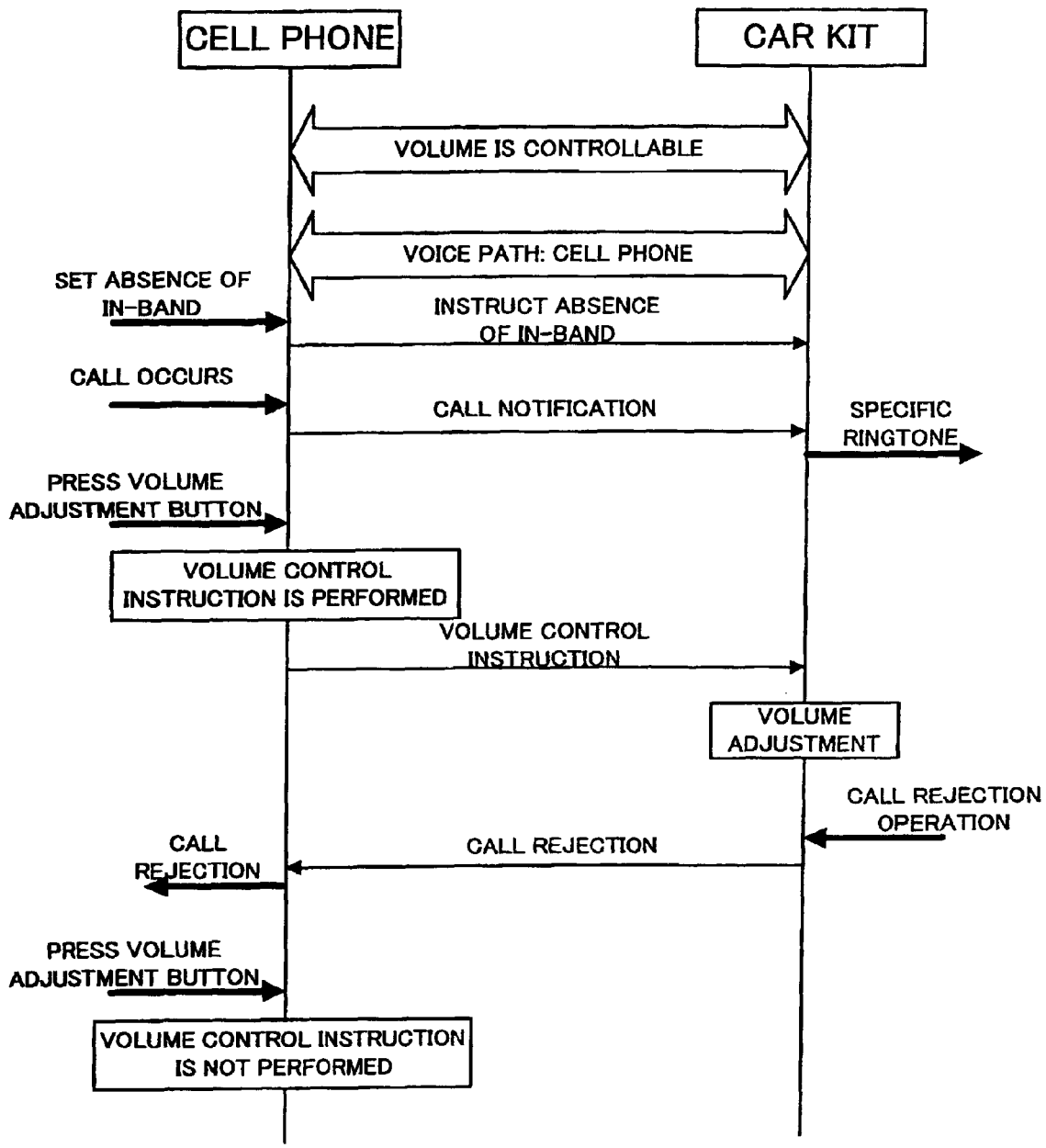
FIG. 5 is a sequence diagram illustrating a cell phone, in which a volume control instruction transmission determining unit is set in a second mode, and on-vehicle equipment according to an embodiment of the invention.
Figure 6:
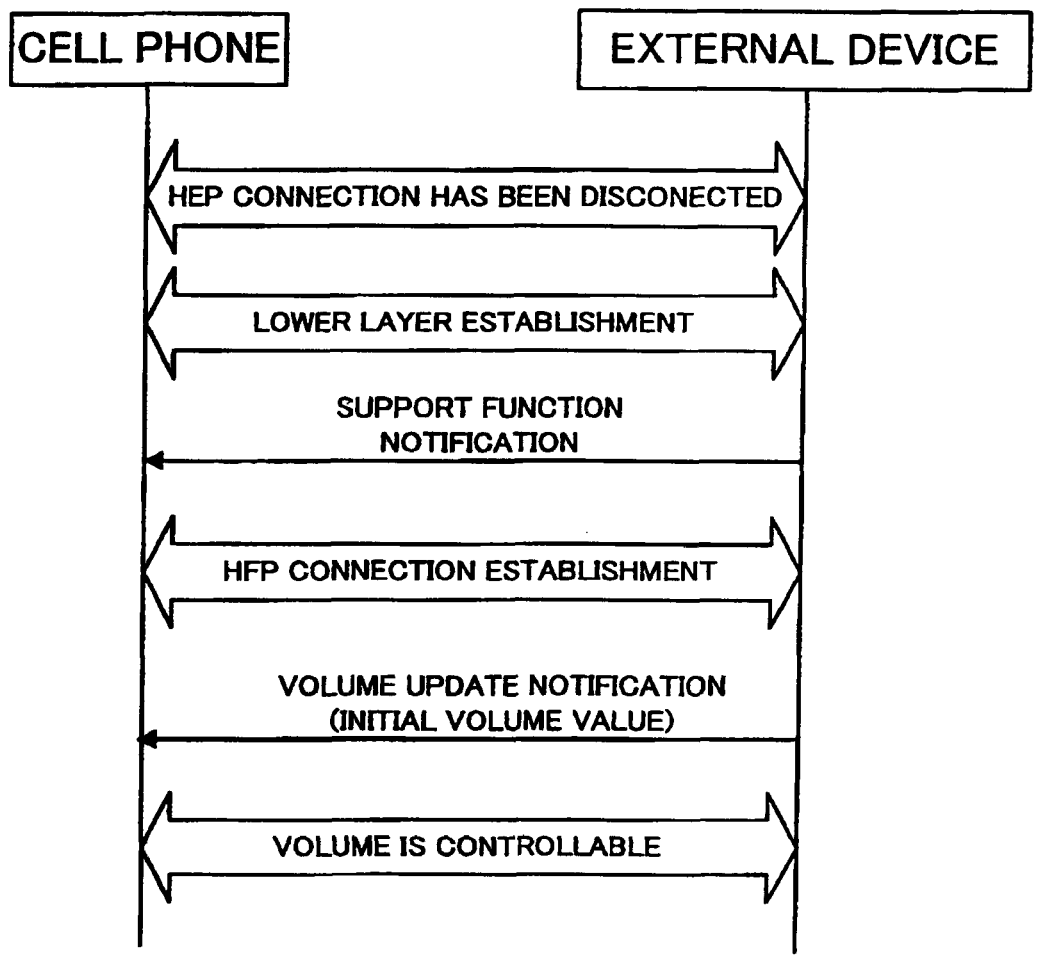
FIG. 6 is a sequence diagram illustrating the operation until a HFP connection is established between a cell phone and external device and a volume controllable state is achieved.

FIG. 5 is a sequence diagram illustrating the cell phone 1, in which the volume control instruction transmission determining unit 58 is set in the second mode, and the car kit 2. In the sequence illustrated in FIG. 5, since the operation until the volume controllable state is achieved is identical to that of the sequence illustrated in FIG. 4, detailed description thereof will be omitted in order to avoid redundancy. The following description will be given on the assumption that the HFP connection is established between the cell phone 1 and the car kit 2, the cell phone 1 can control the volume of the car kit 2, and the voice path is established in the cell phone 1.

When an operation for setting absence of in-band is performed through the operation unit 52 of the cell phone 1, instruction indicating the absence of in-band is notified to the car kit 2 from the cell phone 1. If an incoming call is received through the network communication unit 55, the cell phone 1 notifies the car kit 2 of the reception of the incoming call. However, if the absence of in-band has been set, ringtones are not notified to the car kit 2 and only the information representing the reception of the incoming call is transmitted to the car kit 2. If only the information representing the reception of the incoming call is notified from the cell phone 1, the car kit 2 allows ringtones stored therein to ring.

At this time, if the volume adjustment signal is received from the operation unit 52 of the cell phone 1, the volume control instruction transmission determining unit 58 determines whether to perform the volume control instruction. For example, when the second mode has been set in the volume control instruction transmission determining unit 58, since the cell phone 1 is in the incoming state, the cell phone 1 performs the volume control instruction with respect to the car kit 2. For example, in the case in which the initial volume setting value "10" of the car kit 2 is notified to the cell phone 1 from the car kit 2 by using the volume update notification when the HFP connection has been established between the cell phone 1 and the car kit 2, if the volume-down operation is performed through the operation unit 52 of the cell phone 1, at least one of volume setting values "0" to "9" is transmitted to the car kit 2.

As described above, when the incoming call occurs, since the cell phone 1 can perform the volume control instruction with respect to the external device, the volume of the external device can be controlled to an appropriate level even when the external device is a headset having no volume adjustment means.

Then, if a call rejection signal is input to the car kit 2, the car kit 2 notifies the cell phone 1 of call rejection. After receiving the call rejection notification, the cell phone 1 controls the network communication unit 55 to complete the reception of an incoming call. If the reception of the incoming call is completed as described above, a standby state is achieved other than the incoming state and the communication state. When the call state of the cell phone 1 is not the incoming state, if the volume adjustment signal is received from the operation unit 52, the volume control instruction transmission determining unit 58 determines that the volume control instruction is not performed because the incoming call does not occur.

As described above, when the incoming call does not occur, the cell phone 1 is prevented from performing the volume control instruction with respect to the car kit 2. In the case in which the volume adjustment signal is received from the operation unit 52 of the cell phone 1 due to a mistake by a user, if volume control is carelessly performed, when an incoming call has occurred or a voice link has been established thereafter, sound with a high level may be suddenly output from the external device. However, this problem can be avoided by preventing the cell phone 1 from performing the volume control with respect to the external device when the incoming call does not occur.

As described above, the cases in which the volume control instruction transmission determining unit 58 is set in the first and second modes are described using the sequence diagrams illustrated in FIGS. 4 and 5. If the case, in which the volume control instruction transmission determining unit 58 is set in the third mode, corresponds to at least one of the case of determining that the volume control instruction is performed in the first mode and the case of determining that the volume control instruction is performed in the second mode, it is determined that the volume control instruction is performed. Consequently, in the case in which the volume control instruction transmission determining unit 58 is set in the third mode, it is possible to control the volume of the external device even when the incoming call occurs as described using FIG. 5, in addition to the case of "the communication state" or the case of notifying the ringtone as described using FIG. 4.

In addition, the invention is not limited to the above embodiment and various modifications can be made without departing from the scope of the invention.

While certain embodiments of the inventions have been described, these embodiments have been presented by way of example only, and are not intended to limit the scope of the inventions. Indeed, the novel terminal described herein may be embodied in a variety of other forms; furthermore, various omissions, substitutions and changes in the form of the terminal described herein may be made without departing from the spirit of the inventions. The accompanying claims and their equivalents are intended to cover such forms or modifications as would fall within the scope and spirit of the inventions.

What is claimed is:

1. A wireless communication terminal comprising:
   a network communication unit configured to transmit radio signals to communication network via a base station;
   a short distance wireless communication unit configured to transmit radio signals to and from an external device, the short distance wireless communication unit establishes a voice link between the wireless communication terminal and the external device to transmit sound data;
   an input unit configured to input a volume control instruction; and
   a control unit configured to control the short distance wireless communication unit to send a signal based on the volume control instruction if the voice channel has been established between the wireless communication terminal and the external device.

2. The wireless communication terminal according to claim 1, wherein the control unit detects the volume control instruction after the control unit receives information indicating that the external device supports volume control function and a volume value of the external device by using the short distance wireless communication unit.

3. The wireless communication terminal according to claim 1, wherein the control unit controls the short distance wireless communication unit so as not to send a signal based on the volume control instruction if the voice channel has not been established between the wireless communication terminal and the external device.

4. The wireless communication terminal according to claim 1, further comprising:
   a speaker configured to output a sound representing that the volume control is impossible if the voice channel has not been established between the wireless communication terminal and the external device when the volume control instruction is detected.

5. The wireless communication terminal according to claim 1, further comprising:
   a display configured to output a image or characters representing that the volume control is impossible if the voice channel has not been established between the wireless communication terminal and the external device when the volume control instruction is detected.

6. A wireless communication terminal comprising:
   a network communication unit configured to send and receive radio signals to and from a communication network via a base station;
   a short distance wireless communication unit configured to send and receive radio signals to and from an external device, the short distance wireless communication unit establish a voice channel between the wireless communication terminal and the external device to send and receive sound data;
   a control unit connected to the network communication unit and the short distance wireless communication unit, and configured to control
      detecting a volume control instruction, and
      sending a signal based on the volume control instruction by the short distance wireless communication unit in case of that the wireless communication terminal is receiving an incoming call by the network communication unit.

7. The wireless communication terminal according to claim 6, further comprising:
   a user interface configured to accept an operation for controlling the volume,
   wherein the control unit detects the volume control instruction if the user interface accepts the operation for controlling the volume.

8. The wireless communication terminal according to claim 6, wherein the control unit detects the volume control instruction after the control unit receives information indicating the external device supports volume control function and a volume value of the external device by using the short distance wireless communication unit.

9. The wireless communication terminal according to claim 6, further comprising:
   a speaker configured to output a sound representing that the volume control is impossible if the wireless communication terminal is not receiving an incoming call when the volume control instruction is detected.

10. The wireless communication terminal according to claim 6, further comprising:
    a display configured to output a image or characters representing that the volume control is impossible if the wireless communication terminal is not receiving an incoming call when the volume control instruction is detected.

11. A sound volume control method applied to a wireless communication terminal which performs voice call with other terminal and short range wireless communication with an external device, comprising:
    detecting a volume control instruction, and
    sending a signal based on the volume control instruction by the short distance wireless communication in case of a voice channel has been established between the wireless communication terminal and the external device or the wireless communication terminal is receiving an incoming call.

12. The sound volume control method according to claim 11, wherein the volume control instruction is detected when the user interface for controlling volume is operated.

13. The sound volume control method according to claim 11, further comprising:
    receiving information indicating the external device supports volume control function and a volume value of the external device in advance of the detection of the volume control instruction.

14. The sound volume control method according to claim 11, further comprising:
    outputting a sound representing that the volume control is impossible if the voice channel has not been established between the wireless communication terminal and the external device or the wireless communication terminal is not receiving an incoming call.

15. The sound volume control method according to claim 11, further comprising:

outputting a image or characters representing that the volume control is impossible if the voice channel has not been established between the wireless communication terminal and the external device or the wireless communication terminal is not receiving an incoming call.

* * * * *